US009902879B2

(12) United States Patent
Jing et al.

(10) Patent No.: US 9,902,879 B2
(45) Date of Patent: Feb. 27, 2018

(54) CATALYZING AMINO-SUBSTITUTED ORGANOSILANE ESTER PRIMERS

(71) Applicant: 3M INNOVATIVE PROPERTIES COMPANY, St. Paul, MN (US)

(72) Inventors: Naiyong Jing, Woodbury, MN (US); Peter O. Rekow, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 4 days.

(21) Appl. No.: 14/348,855

(22) PCT Filed: Sep. 26, 2012

(86) PCT No.: PCT/US2012/057178
§ 371 (c)(1),
(2) Date: Mar. 31, 2014

(87) PCT Pub. No.: WO2013/049095
PCT Pub. Date: Apr. 4, 2013

(65) Prior Publication Data
US 2014/0248457 A1    Sep. 4, 2014

Related U.S. Application Data

(60) Provisional application No. 61/540,906, filed on Sep. 29, 2011, provisional application No. 61/541,685, filed on Sep. 30, 2011.

(51) Int. Cl.
*C09J 7/02*  (2006.01)
*B60B 15/28*  (2006.01)
(Continued)

(52) U.S. Cl.
CPC .............. *C09J 7/0289* (2013.01); *B32B 7/06* (2013.01); *B32B 7/12* (2013.01); *B32B 27/065* (2013.01);
(Continued)

(58) Field of Classification Search
CPC ...... C09J 7/0289; C09J 7/0296; C09J 7/0257; B32B 7/06; B32B 7/12; B32B 2255/10;
(Continued)

(56) References Cited

U.S. PATENT DOCUMENTS 3,273,941 A * 9/1966 Skidmore .................. 301/5.21
4,338,237 A   7/1982 Sulzbach
(Continued)

FOREIGN PATENT DOCUMENTS

JP   H04-070331 A   3/1992
JP   H06-228525 A   8/1994
(Continued)

OTHER PUBLICATIONS

3M Wheel Weight System TN4023 (PN61405) & TN4715 (PN61403), Nov. 2009, 2 pages.
(Continued)

*Primary Examiner* — Scott R Walshon
(74) *Attorney, Agent, or Firm* — Qiang Han; Stephen L. Crooks

(57) ABSTRACT

Methods for bonding a polymer surface (e.g., a fluoropolymer surface) to a substrate, including foam tape substrates, and articles produced thereby. The methods can include using a primer composition having an amidine catalyst in combination with an amino-substituted organosilane ester.

19 Claims, 3 Drawing Sheets

(51) Int. Cl.
*F16F 15/32* (2006.01)
*C08J 5/12* (2006.01)
*C09J 5/02* (2006.01)
*B32B 7/06* (2006.01)
*B32B 7/12* (2006.01)
*B32B 27/06* (2006.01)
*B32B 27/20* (2006.01)
*B32B 27/30* (2006.01)
*C09D 5/00* (2006.01)
*F16F 15/34* (2006.01)
*G01M 1/32* (2006.01)

(52) U.S. Cl.
CPC ............ *B32B 27/20* (2013.01); *B32B 27/304* (2013.01); *B60B 15/28* (2013.01); *C08J 5/128* (2013.01); *C09D 5/002* (2013.01); *C09J 5/02* (2013.01); *C09J 7/0257* (2013.01); *C09J 7/0296* (2013.01); *F16F 15/328* (2013.01); *B32B 2255/10* (2013.01); *B32B 2255/26* (2013.01); *B32B 2255/28* (2013.01); *B32B 2264/105* (2013.01); *B32B 2307/748* (2013.01); *B32B 2605/00* (2013.01); *F16F 15/34* (2013.01); *G01M 1/32* (2013.01); *Y10T 428/1429* (2015.01); *Y10T 428/249982* (2015.04); *Y10T 428/249983* (2015.04); *Y10T 428/2843* (2015.01)

(58) Field of Classification Search
CPC ............ B32B 2255/26; B32B 2255/28; B32B 2264/105; B32B 2307/748; C09D 5/002; Y10T 428/249983; Y10T 428/249982; B60B 15/28; A63H 11/262; F16F 15/32; F16F 15/324; F16F 15/34; G01M 1/32; G01M 1/36; F01D 5/027; F01D 5/10; B60C 19/003
See application file for complete search history.

(56) References Cited

U.S. PATENT DOCUMENTS

| | | | |
|---|---|---|---|
| 4,495,247 A | 1/1985 | Vasta | |
| 5,285,002 A | 2/1994 | Grootaert | |
| 5,478,652 A | 12/1995 | Grootaert | |
| 5,500,042 A | 3/1996 | Grootaert | |
| 5,658,671 A * | 8/1997 | Fukushi | 428/421 |
| 6,156,400 A * | 12/2000 | Jing | B32B 27/08 |
| | | | 428/195.1 |
| 6,413,626 B1 * | 7/2002 | Wollner | 428/317.3 |
| 6,497,949 B1 | 12/2002 | Hyde | |
| 6,753,087 B2 | 6/2004 | Jing | |
| 6,759,129 B2 | 7/2004 | Fukushi | |
| 7,485,371 B2 | 2/2009 | Jing | |
| 7,491,356 B2 | 2/2009 | Heikkila | |
| 7,598,302 B2 | 10/2009 | DiMascio | |
| 2002/0086942 A1 | 7/2002 | Fujita et al. | |
| 2006/0111505 A1 | 5/2006 | Schindler et al. | |
| 2008/0064825 A1 | 3/2008 | Jing | |
| 2008/0258537 A1 | 10/2008 | Sugayauchi et al. | |
| 2009/0162664 A1 | 6/2009 | Ou | |
| 2009/0254171 A1 | 10/2009 | Heikkila | |
| 2009/0324875 A1 | 12/2009 | Heikkila | |
| 2010/0041810 A1 * | 2/2010 | Wakabayashi | 524/425 |
| 2010/0063215 A1 | 3/2010 | Yano et al. | |
| 2010/0075132 A1 | 3/2010 | Waid | |
| 2010/0279100 A1 | 11/2010 | Heikkila | |
| 2010/0280145 A1 | 11/2010 | Heikkila | |
| 2010/0280164 A1 | 11/2010 | Heikkila | |

FOREIGN PATENT DOCUMENTS

| | | |
|---|---|---|
| JP | 07126579 A2 | 5/1995 |
| JP | H10-008021 A | 1/1998 |
| JP | 10168419 A2 | 6/1998 |
| JP | 11209701 A2 | 8/1999 |
| JP | 2002-508487 A | 3/2002 |
| JP | 2005-535779 | 11/2005 |
| JP | 2006-046622 A | 2/2006 |
| JP | 2007-302774 A | 11/2007 |
| JP | 2008267480 A | 11/2008 |
| WO | WO 2000-22032 | 4/2000 |
| WO | WO 2001-036556 | 5/2001 |
| WO | WO 2008-070386 | 6/2008 |
| WO | WO 2008/078654 | 7/2008 |

OTHER PUBLICATIONS

3M Wheel Weights PN99473 and PN55409, May 2011, 2 pages.
3M Solar Acrylic Foam Tape 2110, 2011, 2 pages.
Handbook of Polymer Foams, David Eaves, editor, published by Shawbury, Shrewshitre, Shropshitre, UK : Rapra Technology, 2004, 4 pages.
International search Report for PCT International Application No. PCT/US2012/057178dated Oct. 21, 2013, 5 pages.

* cited by examiner

CATALYZING AMINO-SUBSTITUTED ORGANOSILANE ESTER PRIMERS

STATEMENT OF PRIORITY

This application claims the priorities of U.S. Provisional Application No. 61/540,906 filed Sep. 29, 2011, and U.S. Provisional Application No. 61/541,685 filed Sep. 30, 2011, the contents of each of which are hereby incorporated by reference.

BACKGROUND

Fluorine-containing polymers (also known as "fluoropolymers") are a commercially useful class of materials. Fluoropolymers include, for example, crosslinked fluoroelastomers and semi-crystalline or glassy fluoropolymers. Fluoropolymers are generally of high thermal stability and are particularly useful at high temperatures. They may also exhibit extreme toughness and flexibility at very low temperatures. Many of these fluoropolymers are almost totally insoluble in a wide variety of solvents, and are generally chemically resistant. Some have extremely low dielectric loss and high dielectric strength, and may have unique non-adhesive and low friction properties. Fluoroelastomers, particularly the copolymers of vinylidene fluoride with other ethylenically unsaturated halogenated monomers such as hexafluoropropylene, have particular utility in high temperature applications such as seals, gaskets, and linings.

Multi-layer constructions containing a fluoropolymer enjoy wide industrial application. Adhesion between the layers of a multi-layered article may need to meet various performance standards dependent on the use of the finished article. However, it is often difficult to establish high bond strengths when one of the layers is a fluoropolymer, in part because of the non-adhesive qualities of fluoropolymers.

SUMMARY

In one aspect, the disclosure provides a bonded article comprising: a composite element comprising a polymer and particulate dispersed in the polymer; a primer layer comprising an amino-substituted organosilane ester and an amidine catalyst; and a first adhesive layer, herein the primer layer bonds together the composite element and the first adhesive layer.

In another aspect, the disclosure provides a bonded article comprising: a composite element comprising a polymer and particulate dispersed in the polymer; a primer layer comprising an amino-substituted organosilane ester; and a first adhesive layer, wherein the primer layer bonds together the composite element and the first adhesive layer.

In another aspect, the disclosure provides a method of bonding a composite element to a foam tape layer, the method comprising: providing a composite element comprising a polymer and particulate dispersed in the polymer; providing a primer comprising an amino-substituted organosilane ester, an amidine catalyst, and a solvent; providing a foam layer having a first adhesive layer disposed on a first major surface of the foam layer; disposing the primer onto the composite element, the first adhesive layer, or both, to form a primer layer; and bringing together the composite element and the first adhesive layer, wherein the primer layer is positioned between the composite element and the first adhesive layer.

In another aspect, the disclosure provides a method of bonding a composite element to a foam tape layer, the method comprising: providing a composite element comprising a polymer and particulate dispersed in the polymer; providing a primer comprising an amino-substituted organosilane ester and a solvent; providing a foam layer having a first adhesive layer disposed on a first major surface of the foam layer; disposing the primer onto the composite element, the first adhesive layer, or both, to form a primer layer; and bringing together the composite element and the first adhesive layer, wherein the primer layer is positioned between the composite element and the first adhesive layer.

In another aspect, the disclosure provides a primer composition comprising: an amino-substituted organosilane ester; and an amidine catalyst, wherein the amidine catalyst is a bicyclic amidine. In some embodiments, the bicyclic amidine is 1,8-diazabicyclo[5.4.0]undec-7-ene (DBU).

Useful articles of the present disclosure include automobile wheel weights.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

Figure 1:
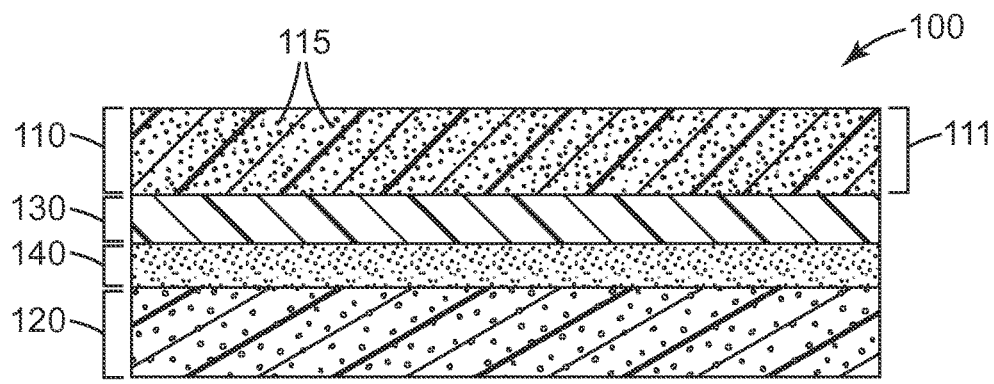
FIG. 1 is a profile view of an exemplary embodiment of an article of the present disclosure.

FIG. 1 illustrates an exemplary embodiment of an article 100 of the present description, including: a composite element (or layer) 110, a primer layer 130, a first adhesive layer 140, and an optional foam layer 120, wherein primer layer 130 bonds together the composite element 110 and first adhesive layer 140. When foam layer 120 is used, first adhesive layer 140 is positioned between primer layer 130 and foam layer 120. Composite element 110 can include particulate 115 dispersed in a polymer matrix (or layer) 111. The particulate 115 can comprise metal (i.e., elemental or alloyed), inorganic non-metal, or organic materials, and polymer matrix 111 can comprises any suitable polymeric material (e.g., a fluoropolymer).

A composite fluoropolymer layer that includes a metal particulate material may be useful in applications where it is desirable to increase the density of a fluoropolymer layer. For example, it may be desirable to combine the stability and viscoelastic properties of a fluoropolymer and the density of a metal in a weighted article used as an automobile wheel weight. Composite fluoropolymers that include metal particulate material can be prepared by intimately blending a fluoropolymer with a metal particulate material, optionally including a suitable interfacial modifier. Examples of the preparation of composite fluoropolymer layers by blending and extrusion processes include those described in U.S. Pat. No. 7,491,356 (Heikkila), which is incorporated herein by reference for this purpose.

Useful examples of fluoropolymers include perfluorinated and partially fluorinated polymers made with monomers containing one or more atoms of fluorine, and typically copolymers of two or more of such monomers. Examples of fluorinated monomers useful in these polymers or copolymers include tetrafluoroethylene (TFE), hexafluoropropylene (HFP), vinylidene fluoride (VDF), vinyl fluoride (VF), and perfluoroalkylvinyl ethers such as perfluoro-(n-propyl) vinyl ether (PPVE) or perfluoromethyl vinyl ether (PMVE). Other copolymerizable olefinic monomers, including non-fluorinated monomers, may also be present.

The fluoropolymer layer may be a partially fluorinated polymer such as a terpolymer of tetrafluoroethylene, hexafluoropropylene and vinylidene fluoride (THV), polyvinylidene fluoride (PVDF), a copolymer of tetrafluoroethylene and ethylene (ETFE), and other melt-processable fluoroplastics, or may be non-melt processable such as cured fluoroelastomers. Fluoroelastomers may be processed before they are cured by injection or compression molding or other methods normally associated with thermoplastics. Fluoroelastomers after curing or crosslinking may not be able to be further processed. Fluoroelastomers may be coated out of solvent in their uncrosslinked form. Fluoropolymers may also be coated from an aqueous dispersion. Mixtures of fluoropolymers may also be used.

In some embodiments, the fluoropolymer is a copolymer that includes a non-fluorinated olefinic monomer. In some embodiments, the fluoropolymer is a copolymer of vinyl fluoride, vinylidene fluoride, and at least one alkene, including ethylene, propylene, or other alkenes. In some embodiments, the fluoropolymer is a copolymer of HFP, TFE, and at least one alkene, including ethylene, propylene, or other alkenes. For example, in some embodiments the fluoropolymer is a copolymer of TFE, HFE, and at least one olefin selected from the group consisting of ethylene, propylene, 1-butene, and combinations thereof.

In some embodiments, the fluoropolymer is a material that is capable of being extruded or coated as from solution or dispersion. Such fluoropolymers typically are fluoroplastics that have melting temperatures ranging from about 100° C. to about 330° C., more preferably from about 150° C. to about 270° C. Typical fluoroplastics include interpolymerized units derived from vinylidene difluoride (VDF) and tetrafluoroethylene and may further include interpolymerized units derived from other fluorine-containing monomers, non-fluorine-containing monomers, or a combination thereof. Examples of suitable fluorine-containing monomers include tetrafluoroethylene (TFE), hexafluoropropylene (HFP), chlorotrifluoroethylene (CTFE), 3-chloropentafluoropropene, perfluorinated vinyl ethers (e.g., perfluoroalkoxyalkyl vinyl ethers such as $CF_3OCF_2CF_2CF_2OCF=CF_2$ and perfluoroalkyl vinyl ethers such as $CF_3OCF=CF_2$ and $CF_3CF_2CF_2OCF=CF_2$) and vinyl fluoride. Examples of suitable non-fluorine-containing monomers include olefin monomers such as ethylene, propylene, and butylenes.

VDF-containing fluoroplastics may be prepared using emulsion polymerization techniques as described, e.g., in U.S. Pat. No. 4,338,237 (Sulzbach et al.) or U.S. Pat. No. 5,285,002 (Grootaert), both of which are incorporated herein by reference in their entirety. Useful commercially available VDF-containing fluoroplastics include, for example, those fluoropolymers available under the trade designations "THV 200", "THV 400", "THV 500G", "THV 610X" (each of which is available from Dyneon LLC, Oakdale, Minn.), "KYNAR 740" (available from Atochem North America, Philadelphia, Pa.), "HYLAR 700" (available from Ausimont USA, Inc., Morristown, N.J.), and "FLUOREL FC-2178" (available from Dyneon LLC, Oakdale, Minn.).

Examples of suitable fluoropolymers include VDF-HFP copolymers, VDF-HFP-TFE terpolymers, TFE-propylene copolymers, and VDF-VF-alkene copolymers. Another example of a suitable fluoropolymer is the vinyl fluoride homopolymer, such as TEDDLAR, available from DuPont (Wilmington, Del).

In some embodiments, polymer matrix 111 can include TFE-HFP-VDF terpolymers (melting temperature of about 100 to 260° C.; melt flow index at 265° C. under a 5 kg load is about 1-30 g-10 $min^{-1}$), hexafluoropropylene-tetrafluoroethylene-ethylene (HTE) terpolymers (melting temperature about 150 to 280° C.; melt flow index at 297° C. under a 5 kg load of about 1-30 g-10 $min^{-1}$), ethylene-tetrafluoroethylene (ETFE) copolymers (melting temperature about 250 to 275° C.; melt flow index at 297° C. under a 5 kg load of about 1-30 g-10 $min^{-1}$), hexafluoropropylene-tetrafluoroethylene (FEP) copolymers (melting temperature about 250 to 275° C.; melt flow index at 372° C. under a 5 kg load of about 1-30 g-100 $min^{-1}$), and copolymers of tetrafluoroethylene and perfluoro(alkoxyalkene) (PFA) (melting temperature about 300 to 320° C.; melt flow index at 372° C. under a 5 kg load of about 1-30 g-10 $min^{-1}$). Each of these fluoropolymers is commercially available from Dyneon LLC, Oakdale, Minn. The TFE-HFP-VDF terpolymers are sold under the trade designation "THV".

Composite element 110 includes particulate 115. Suitable examples and methods of making composite fluoropolymer layers that include metal particulate include those described in U.S. Pat. No. 7,491,356 (Heikkila), U.S. Pat. App. No. 2009/0324875 (Heikkila), and U.S. Pat. App. No. 2009/0254171 (Heikkila), the descriptions of each of which are incorporated herein by reference in their entirety. In some embodiments, particulate 115 typically has an effective particle size of at least 10 micrometers (less than 10 weight percent, often less than 5 weight percent of the metal particulate has a particle size of less than 10 micrometers). In some embodiments, a broad range of particle sizes may be useful in attaining close association between particulate 115 and polymer matrix 111. For example, the distribution of particulate 115 may contain at least 5 weight percent in the range of about 10 to 70 micrometers, at least 5 weight percent in the range of about 70 to 250 micrometers, at least 5 weight percent in the range of about 250 to 500 micrometers, and at least 5 weight percent in the 500+ micrometer range. In some embodiments, the metal particulate typically has an aspect ratio of 1:1.5 (in some embodiments, 1.0:1.4, 1.0:1.3, 1.0:1.2, 1.0:1.1, or even in some embodiments an aspect ratio of 1.0:1.0), and typically reflects a substantially circular cross section or spherical particle. Blends of two, three or more metals in particulate form may also be useful in obtained desired properties related to density, stability, or other desirable properties.

In some embodiments, particulate 115 can be a metal particulate that includes any of bismuth, chromium, copper, ferrous metal, tin, tungsten, zinc, or mixtures thereof. In some embodiments, the metal particulate is stainless steel.

In some embodiments, particulate 115 can be inorganic non-metal, or organic materials, in accordance with the composites described in U.S. Patent Publication Nos. 2010/0279100 (Heikkila et al.), 2010/0280145 (Heikkila et al.), and 2010/0280164 (Heikkila et al.), the disclosures of each of which are incorporated herein in their entirety.

It will be understood that other types of particulates may be dispersed in composite element 110, provided that the particles can be dispersed in composite element 110 and do not interfere with the bonding between composite element 110 and primer layer 130.

Primer layer 130 includes an amino-substituted organosilane ester and an amidine catalyst. In some embodiments, a useful primer composition includes an amino-substituted organosilane ester, an amidine catalyst, and a solvent to facilitate applying a coating of the primer composition to a surface of composite element 110, first adhesive layer 140, or both. The solvent may then be removed, for example, by drying, prior to bringing together composite element 110 and first adhesive layer 140. Examples of solvents that can be used include acetone, isopropyl alcohol, and methyl ethyl ketone. In some embodiments, suitable solvents can include acetone, methyl ethyl ketone, or a mixture thereof.

The amino-substituted organosilane ester may have a hydrolyzable substituent; for example, it may be a trialkoxysilane. The amino-substituted organosilane ester or ester equivalent bears on the silicon atom at least one ester or ester equivalent group, preferably 2, or more preferably 3 groups. Ester equivalents are well known to those skilled in the art and include compounds such as silane amides (RNR'Si), silane alkanoates (RC(O)OSi), Si—O—Si, SiN(R)—Si, SiSR and RCONR'Si. These ester equivalents may also be cyclic such as those derived from ethylene glycol, ethanolamine, ethylenediamine and their amides. R and R' are "ester equivalents". "Ester equivalent" refers to groups such as silane amides (RNR'Si), silane alkanoates (RC(O)OSi), Si—O—Si, SiN(R)—Si, SiSR and RCONR'Si that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R' except it may not be H. An example of a cyclic ester equivalent is

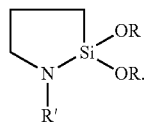

In this example of a cyclic ester equivalent, R' is as defined in the immediately preceding definition except that it may not be aryl. 3-aminopropyl alkoxysilanes are well known to cyclize on heating and these RNHSi compounds would be useful in exemplary embodiments of the present disclosure. Preferably the amino-substituted organosilane ester or ester equivalent has ester groups such as methoxy that are easily volatilized as methanol so as to avoid leaving residue at the interface which may interfere with bonding. The amino-substituted organosilane must have at least one ester equivalent; for example, it may be a trialkoxysilane. For example, the amino-substituted organosilane may have the formula

ZNH-L-SiX'X"X'"

where Z is hydrogen, alkyl, or substituted alkyl including amino-substituted alkyl; where L is a divalent straight chain $C_1$-$C_{12}$ alkylene or may comprise a $C_3$-$C_8$ cycloalkylene, 3-8 membered ring heterocycloalkylene, $C_2$-$C_{12}$ alkenylene, $C_4$-$C_8$ cycloalkenylene, 3-8 membered ring heterocycloalkenylene, or heteroarylene unit. L may be interrupted by one or more divalent aromatic groups or heteroatomic groups. The aromatic group may include a heteroaromatic. The heteroatom is preferably nitrogen, sulfur or oxygen. L is optionally substituted with $C_1$-$C_4$ alkyl, $C_2$-$C_4$ alkenyl, $C_2$-$C_4$ alkynyl, $C_1$-$C_4$ alkoxy, amino, $C_3$-$C_6$ cycloalkyl, 3-6 membered heterocycloalkyl, monocyclic aryl, 5-6 membered ring heteroaryl, $C_1$-$C_4$ alkylcarbonyloxy, $C_1$-$C_4$ alkyloxycarbonyl, $C_1$-$C_4$ alkylcarbonyl, formyl, $C_1$-$C_4$ alkylcarbonylamino, or $C_1$-$C_4$ aminocarbonyl. L is further optionally interrupted by —O—, —S—, —N(Rc)-, —N(Rc)-C(O)—, —N(Rc)-C(O)—O—, —O—C(O)—N(Rc)-, —N(Rc)-C(O)—N(Rd)-, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl; and each of X', X" and X'" is a $C_1$-$C_{18}$ alkyl, halogen, $C_1$-$C_8$ alkoxy, $C_1$-$C_8$ alkylcarbonyloxy, or amino group, with the proviso that at least one of X', X", and X'" is a labile group. Further, any two or all of X', X" and X'" may be joined through a covalent bond. The amino group may be an alkylamino group. Examples of amino-substituted organosilanes include 3-aminopropyltrimethoxysilane (SILQUEST A-1110), 3-aminopropyltriethoxysilane (SILQUEST A-1100), 3-(2-aminoethyl)aminopropyl trimethoxysilane (SILQUEST A-1120), SILQUEST A-1130, (aminoethylaminomethyl)phenethyltrimethoxysilane, (aminoethylaminomethyl)phenethyltriethoxysilane, N-(2-aminoethyl)-3-aminopropylmethyldimethoxysilane (SILQUEST A-2120), bis-(γ-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, (2-aminoethyl)phenyltrimethoxysilane, 3-aminopropyltris(methoxyethoxyethoxy)silane, 3-aminopropylmethyldiethoxysilane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and the cyclic ester compounds shown immediately below:

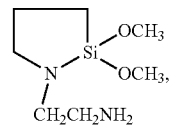 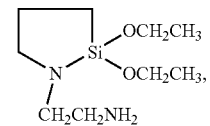

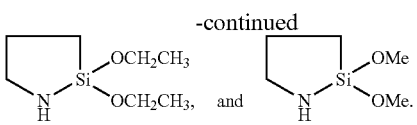

Additional "precursor" compounds such as a bis-silyl urea [RO)$_3$Si(CH$_2$)NR]$_2$C=O are also examples of amino-substituted organosilane ester or ester equivalent that liberate amine by first dissociating thermally.

The aminosilane preferably includes primary amine as this is expected to be more reactive in bonding applications. An example of a particularly useful amino-substituted organosilane ester for exemplary embodiments of the present disclosure is 3-(2-aminoethyl)aminopropyl trimethoxysilane.

It has been discovered that amidines and guanidines can catalyze the reaction of amino organo-substituted silane esters with fluoropolymer layers and acrylate adhesive layers. Useful amidine catalysts include those that can be represented by the following general formula:

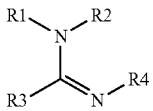

wherein R1, R2, R3, and R4 are each independently selected from hydrogen, monovalent organic groups, monovalent heteroorganic groups (e.g., comprising nitrogen, oxygen, phosphorus, or sulfur, in the form of groups or moieties that are bonded through a carbon atom and that do not contain acid functionality such as carboxylic or sulfonic), and combinations thereof; and wherein two or more of R1, R2, R3, and R4 optionally can be bonded together to form a ring structure (preferably, a five-, six-, or seven-membered ring; more preferably, a six- or seven-membered ring). The organic and heterorganic groups preferably have from 1 to about 20 carbon atoms (more preferably, from 1 to about 10 carbon atoms; most preferably, from 1 to about 6 carbon atoms).

Amidines comprising at least one ring structure (i.e., cyclic amidines) are generally preferred. Cyclic amidines comprising two ring structures (i.e., bicyclic amidines) are more preferred.

Representative examples of useful amidine catalysts include 1,2-dimethyl-1,4,5,6-tetrahydropyrimidine, 1-ethyl-2-methyl-1,4,5,6-tetrahydropyrimidine, 1,2-diethyl,1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (i.e., 1,8-diazabicyclo[5.4.0]undec-7-ene), DBN (i.e., 1,5-diazabicyclo[4.3.0]non-5-ene), and combinations thereof. Preferred amidines include 1,2-dimethyl-1,4,5,6-tetrahydropyrimidine, DBU, DBN, and mixtures thereof, with DBU, DBN, and mixtures thereof being more preferred, and DBU most preferred.

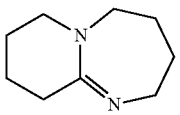 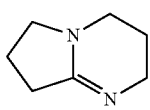

Useful guanidines include those that can be represented by the following general formula:

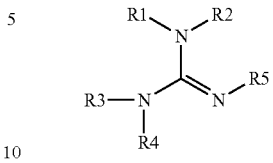

wherein R1, R2, R3, R4, and R5 are each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof; and wherein any two or more of R1, R2, R3, R4, and R5 optionally can be bonded together to form a ring structure (preferably, a five-, six-, or seven-membered ring; more preferably, a five- or six-membered ring; most preferably, a six-membered ring. The organic and heteroorganic groups preferably have from 1 to about 20 carbon atoms (more preferably, from 1 to about 10 carbon atoms; most preferably, from 1 to about 6 carbon atoms).

Guanidines comprising at least one ring structure (that is, cyclic guanidines) are generally preferred. Cyclic guanidines comprising two ring structures (that is, bicyclic guanidines) are more preferred.

Representative examples of useful guanidine compounds include 1-methylguanidine, 1-n-butylguanidine, 1,1-dimethylguanidine, 1,1-diethylguanidine, 1,1,2-trimethylguanidine, 1,2,3-trimethylguanidine, 1,3-diphenylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, TBD (that is, 1,5,7-triazabicyclo[4.4.0]dec-5-ene), MTBD (that is, 7-methyl-1,5,7-triazabicyclo[4.4.0]dec-5-ene), 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, 7-decyl-1,5,7-triazabicyclo[4.4.0]dec-5-ene, biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisguanide, 1-[3-(diethylamino)propyl]biguanide, 1-[3-(dibutylamino)propyl]biguanide, N',N'''-dihexyl-3,12-diimino-2,4,11,13-tetraazatetradecanediamidine, and the like, and combinations thereof. Preferred guanidines include TBD (that is, 1,5,7-triazabicyclo[4.4.0]dec-5-ene), MTBD (that is, 7-methyl-1,5,7-triazabicyclo[4.4.0]dec-5-ene), 2-tent-butyl-1,1,3,3-tetramethylguanidine, and combinations thereof.

In some embodiments, for example, when the composite fluoropolymer layer includes a copolymer of TFE, HFE, and at least one olefin selected from the group including of ethylene, propylene, 1-butene, and combinations thereof and the particulate is stainless steel and the amino-substituted organosilane ester is 3-(2-aminoethyl)aminopropyl trimethoxysilane, then the amidine catalyst can be an amidine catalyst other than 1,8-diazabicyclo[5.4.0]undec-7-ene.

Without being bound by theory, it is thought that strongly basic bicyclic amidines, including DBU and DBN, may aid in deprotonation and/or elimination chemistry involved in the formation of covalent bonds between the polymer in composite element 110 and the amino-substituted organosilane ester in primer layer 130.

In some embodiments of a primer composition of the present disclosure, useful concentrations of the amino-substituted organosilane ester in the solvent include 0.1 weight percent to 20 weight percent based on the total weight of primer composition (or in some embodiments 1 weight percent to 10 weight percent, or even in some embodiments 2.5 weight percent to 5 weight percent) based on the total weight of primer composition. In some embodiments, useful concentrations of the amidine catalyst include 0 weight percent to 3 weight percent (or in some embodiments from 0.2 weight percent to 2 weight percent, or even in some embodiments from 0.5 weight percent to 1 weight percent) based on the total weight of the primer composition.

In some embodiments, primer layer 130 comprises the amino-substituted organosilane ester in a range of from 70 weight percent to 100 (in some embodiments, from 80 to 100 weight percent, or from 90 to 99 weight percent, or even in some embodiments from 95 to 99 weight percent) based on the total weight of primer layer 130; and the amidine catalyst in a range of from 0 weight percent to 30 weight percent (in some embodiments, or from 1 to 20 weight percent, or from 5 to 20 weight percent, or even in some embodiments from 5 to 15 weight percent) based on the total weight of primer layer 130. In some other embodiments, primer layer 130 comprises the amino-substituted organosilane ester in at least 95 weight percent based on the total weight of primer layer 130.

Referring again to FIG. 1, first adhesive layer 140 is positioned between primer layer 130 and foam layer 120. Suitable examples of first adhesive layer 140 include pressure-sensitive acrylic adhesives, for example, those pressure-sensitive acrylic adhesives described in U.S. Pat. No. 6,497,949 (Hyde et al.), the disclosure of which is incorporated herein by reference in its entirety.

In some embodiments, first adhesive layer 140 may be indirectly bonded to foam layer 120. For example, in some embodiments, one or more additional layers (e.g., webs, scrims, and the like) may be interposed between foam layer 120 and first adhesive layer 140.

In some embodiments, foam layer 120 comprises an open cell foam or a closed cell foam. In some embodiments, the foam comprises a thermoplastic foam. In some embodiments, the foam comprises a thermoset foam. In some embodiments, the foam comprises an acrylic foam. In some embodiments, the foam is a flexible foam. Exemplary foams are described in, for example, the *Handbook of Polymer Foams*, David Eaves, editor, published by Shawbury, Shrewsbury, Shropshitre, UK: Rapra Technology, 2004. Suitable foam layers are also described in U.S. Pat. App. No. 2010/075,132 (Waid et al.), the disclosure of which is incorporated herein by reference in its entirety.

Figure 2:
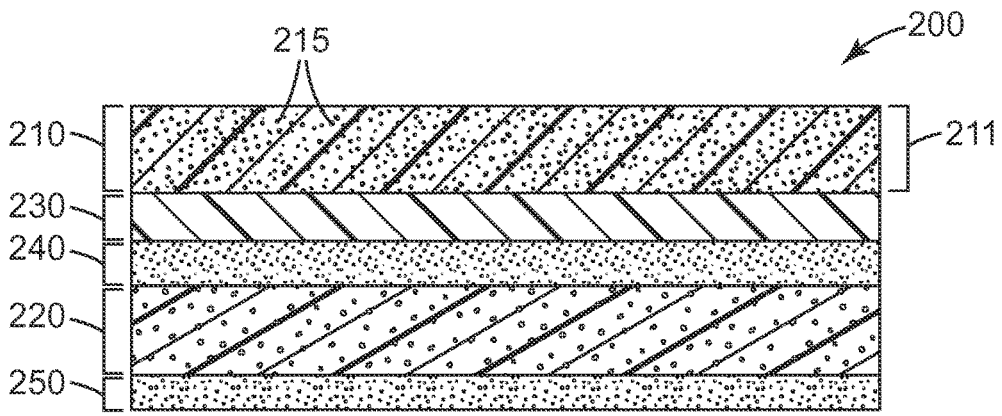
FIG. 2 is a profile view of an exemplary embodiment of an article of the present disclosure.

FIG. 2 shows an exemplary embodiment of an article 200 having layers corresponding to those in article 100 (i.e., composite layer 210 having polymer layer 211 and particulate 215 dispersed in polymer layer 211, primer layer 230, first adhesive layer 240, and foam layer 220, wherein primer layer 230 is positioned between composite polymer layer 210 and first adhesive layer 240, and wherein first adhesive layer 240 is positioned between primer layer 230 and foam layer 220). Article 200 includes second adhesive layer 250, wherein foam layer 220 is positioned between first adhesive layer 240 and second adhesive layer 250. In some embodiments, second adhesive layer 250 has the same composition as first adhesive layer 240. In some other embodiments, second adhesive layer 250 may not have the same composition as first adhesive layer 240, although in such embodiments the composition of second adhesive layer is still typically selected to be a type of acrylic pressure-sensitive adhesive, for example, one of those pressure-sensitive acrylic adhesives described in U.S. Pat. App. No. 2010/075, 132 (Waid et al.) or in U.S. Pat. No. 6,497,949 (Hyde et al.). For some embodiments of the current disclosure, a suitable foam layer 220 having first adhesive layer 240 and second adhesive layer 250 is the double sided foam tape available from 3M Company (St. Paul, Minn.) under the trade designation "3M PRESSURE SENSITIVE ACRYLIC PLUS TAPE EX4008", which is typically provided with a release liner.

Figure 3A:
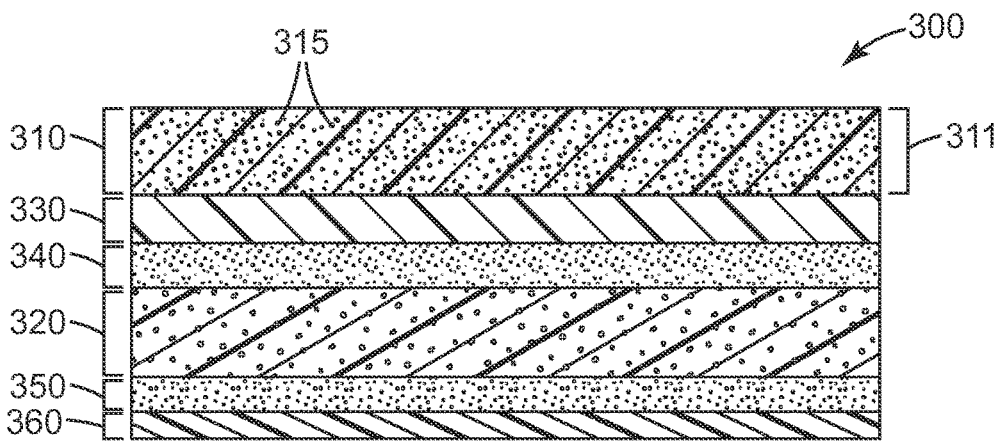
FIG. 3A is a profile view of an exemplary embodiment of an article of the present disclosure.
Figure 3B:
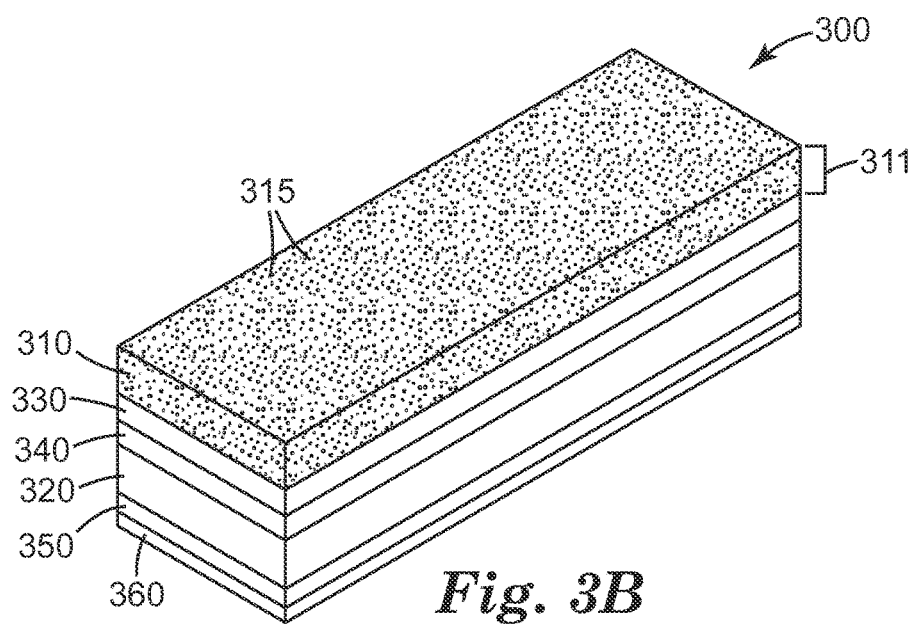
FIG. 3B is an isometric view of an exemplary embodiment of an article of the present disclosure.

FIGS. 3A and 3B illustrate an exemplary embodiment of an article 300 having layers corresponding to those in article 200, and further comprising substrate 360, wherein second adhesive layer 350 is positioned between foam layer 320 and substrate 360. In some embodiments, substrate 360 is a release liner. In some other embodiments, substrate 360 has a metallic surface on which the second adhesive layer 350 is bonded. Substrate 360 can include, for example, a metallic wheel rim of a vehicle (e.g., an automobile, aircraft, etc.). The surface of the substrate is optionally a coated (e.g., painted, anodized, etc.) surface, in which case second adhesive layer 350 is typically bonded to the coating on the substrate surface.

Figure 4A:
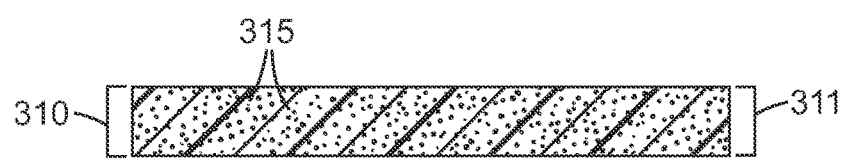
FIGS. 4A to 4C illustrate stages in an exemplary embodiment of a method of the present disclosure.
Figure 4B:
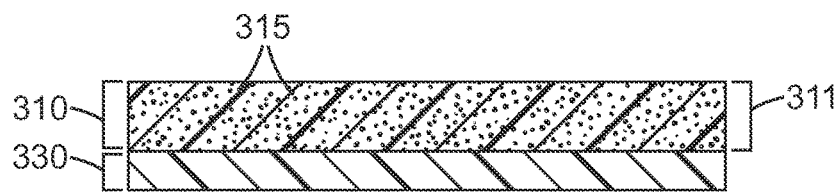
Figure 4C:
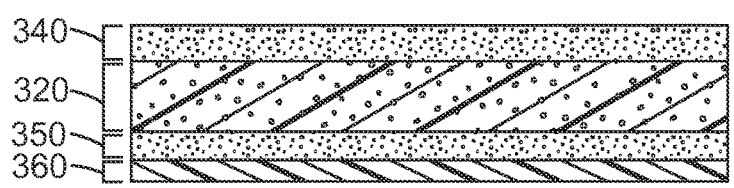

FIGS. 4A to 4C illustrate an exemplary embodiment of intermediate articles during the formation of a bonded article of the present disclosure. FIG. 4A shows composite polymer layer 310 having polymer layer 311 and particulate 315 dispersed in polymer layer 311. Disposing a primer composition of the current disclosure provides the intermediate multilayer structure shown in the exemplary embodiment in FIG. 4B, having primer layer 330 positioned on a major surface of composite polymer layer 310. FIG. 4C shows an exemplary embodiment of foam layer 320, having first adhesive layer 340 disposed on a first major surface thereof, and second adhesive layer 350 disposed on a second major surface thereof, and a substrate 360 (typically, during the bonding operation, substrate 360 is a release liner) disposed on second adhesive layer 350. It will be understood that alternatively, the primer composition may be disposed only onto first adhesive layer 340, or onto both of first adhesive layer 340 and composite polymer layer 310, prior to bringing together polymer layer 310 and first adhesive layer 340, with primer layer 330 sandwiched between those two layers. It will also be understood that solvent in the primer composition may be at least partially removed prior to bring together composite polymer layer 310 and first adhesive layer 340. Further, in some embodiments of the method of the present disclosure, either substrate 360 or both substrate 360 and the second adhesive layer 350 may not be present, as in the production of article 200 or article 100, respectively.

Regarding the removal of solvent from primer layer 130 (or 230 or 330) prior to bringing together composite element 110 (or 210 or 310, respectively) with first adhesive layer 140 (or 240 or 340, respectively), the amount of solvent remaining in primer layer 130 (or 230 or 330, respectively) is typically no more than 20 weight percent (in some embodiments, no more than 15 weight percent, or no more than 10 weight percent, or no more than 5 weight percent, or no more than 2 weight percent, or even in some embodiments no more than 1 weight percent) based on the total weight of primer layer.

Figure 5:
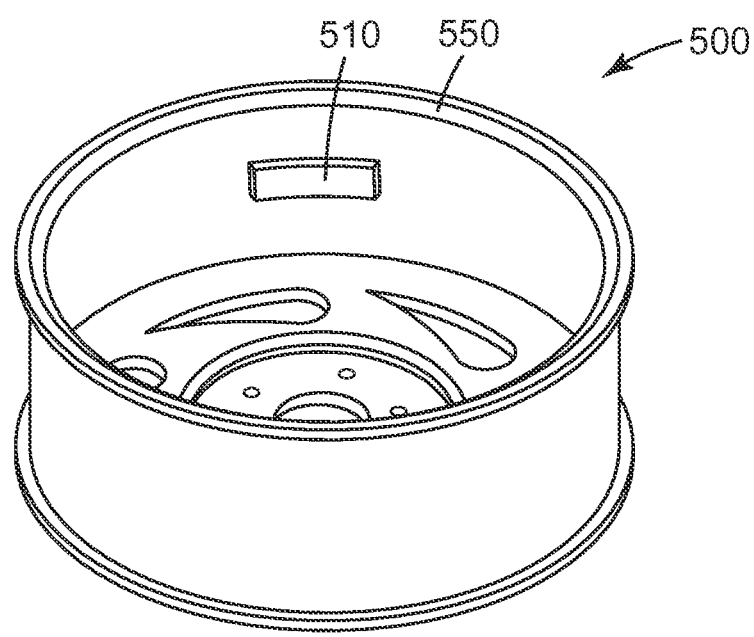
FIG. 5 illustrates an exemplary embodiment of an article of the present disclosure including a substrate, where the substrate is a wheel.

FIG. 5 illustrates an article 500 of the present disclosure where a bonded article 510 adhered to substrate 550, where substrate 550 is an automobile wheel. In some embodiments, article 500 of the present disclosure can optionally be formed to provide bending zones (not shown) in the outer surface of the composite polymer layer, in order to facilitate flexing of the article to conform to a wheel shape.

Advantageously, the primer composition of the present disclosure is useful for rapid (e.g., 10 to 30 seconds) buildup of adhesive strength to levels that allow the bonded article to hold together for subsequent processing steps. Useful articles of the present disclosure include automobile wheel weights.

Embodiments

Embodiment 1. A bonded article comprising:
a composite element comprising a polymer and particulate dispersed in the polymer;
a primer layer comprising an amino-substituted organosilane ester and an amidine catalyst; and
a first adhesive layer,
wherein the primer layer bonds together the composite element and the first adhesive layer.

Embodiment 2. The article of embodiment 1, wherein the polymer is a polymer layer.

Embodiment 3. The article of embodiment 1 or 2, wherein the polymer is a fluoropolymer.

Embodiment 4. The article of embodiment 3, wherein the fluoropolymer is a copolymer of TFE, HFE, and at least one olefin selected from the group consisting of ethylene, propylene, 1-butene, and combinations thereof.

Embodiment 5. The article of embodiment 3, wherein the fluoropolymer is a copolymer of vinyl fluoride, vinylidene fluoride, and at least one olefin selected from the group consisting of ethylene, propylene, 1-butene, and combinations thereof.

Embodiment 6. The article of any preceding embodiment, wherein the particulate is metal particulate.

Embodiment 7. The article of embodiment 6, wherein the metal particulate comprises stainless steel.

Embodiment 8. The article of embodiment 6, wherein the metal particulate comprises any of bismuth, chromium, copper, ferrous metal, tin, tungsten, zinc, or a mixture thereof.

Embodiment 9. The article of any preceding embodiment, further comprising a foam layer.

Embodiment 10. The article of embodiment 9, wherein the first adhesive layer is positioned between the primer layer and the foam layer.

Embodiment 11. The article of any preceding embodiment, wherein the amidine catalyst is a bicyclic amidine.

Embodiment 12. The article of embodiment 11, wherein the amidine catalyst is 1,8-diazabicyclo[5.4.0]undec-7-ene.

Embodiment 13. The article of any preceding embodiment, wherein the primer layer comprises the amino-substituted organosilane ester in a range of from 70 weight percent to 95 weight percent relative to the total weight of the primer composition, and wherein the primer layer comprises the amidine catalyst in a range of from 5 weight percent to 30 weight percent relative to the total weight of the primer composition.

Embodiment 14. The article of embodiment 9 or 10, further comprising a second adhesive layer, wherein the foam layer is positioned between the first adhesive layer and the second adhesive layer.

Embodiment 15. The article of embodiment 14, wherein the second adhesive layer is attached to a substrate.

Embodiment 16. The article of embodiment 15, wherein the substrate is a release liner or a wheel.

Embodiment 17. A method of bonding a composite element to a foam tape layer, the method comprising:
providing a composite element comprising a polymer and particulate dispersed in the polymer;
providing a primer comprising an amino-substituted organosilane ester, an amidine catalyst, and a solvent;
providing a foam layer having a first adhesive layer disposed on a first major surface of the foam layer;
disposing the primer onto the composite element, the first adhesive layer, or both, to form a primer layer; and
bringing together the composite element and the first adhesive layer, wherein the primer layer is positioned between the composite element and the first adhesive layer.

Embodiment 18. The method of embodiment 17, wherein the polymer is a polymer layer.

Embodiment 19. The method of embodiment 17 or 18, wherein the polymer is a fluoropolymer.

Embodiment 20. The method of embodiment 19, wherein the fluoropolymer is a copolymer of TFE, HFE, and at least one olefin selected from the group consisting of ethylene, propylene, 1-butene, and combinations thereof.

Embodiment 21. The method of embodiment 19, wherein the fluoropolymer is a copolymer of vinyl fluoride, vinylidene fluoride, and at least one olefin selected from the group consisting of ethylene, propylene, 1-butene, and combinations thereof.

Embodiment 22. The method of any one of embodiments 17 to 21, wherein the particulate is metal particulate.

Embodiment 23. The method of embodiment 22, wherein the metal particulate comprises any of bismuth, chromium, copper, ferrous metal, tin, tungsten, zinc, or a mixture thereof.

Embodiment 24. The method of embodiment 22, wherein the metal comprises stainless steel.

Embodiment 25. The method of any one of embodiments 17 to 24, wherein the amidine catalyst is a bicyclic amidine.

Embodiment 26. The method of embodiment 25, wherein the amidine catalyst is 1,8-diazabicyclo[5.4.0]undec-7-ene.

Embodiment 27. The method of embodiment 17, wherein the solvent is acetone, methyl ethyl ketone, or a mixture thereof.

Embodiment 28. The method of any one of embodiments 17 to 27, wherein the amino-substituted organosilane ester is 3-(2-aminoethyl)aminopropyl trimethoxysilane.

Embodiment 29. The method of any one of embodiments 17 to 28, wherein the foam layer further comprises a second adhesive layer disposed on a second major surface thereof.

Embodiment 30. The method of embodiment 29, further comprising adhering the second adhesive layer to a substrate.

Embodiment 31. A primer composition comprising:
an amino-substituted organosilane ester; and
an amidine catalyst, wherein the amidine catalyst is a bicyclic amidine.

Embodiment 32. The primer composition of embodiment 31, wherein the bicyclic amidine is 1,8-diazabicyclo[5.4.0]undec-7-ene.

Embodiment 33. The primer composition of embodiment 31 or 32, further comprising a solvent.

Embodiment 34. The primer composition of embodiment 33, wherein the solvent is acetone, methyl ethyl ketone, or a mixture thereof.

Embodiment 35. A bonded article comprising:
a composite element comprising a polymer and particulate dispersed in the polymer;
a primer layer comprising an amino-substituted organosilane ester; and
a first adhesive layer,
wherein the primer layer bonds together the composite element and the first adhesive layer.

Embodiment 36. The article of embodiment 35, wherein the particulate is metal particulate.

Embodiment 37. The article of embodiment 36, wherein the metal particulate comprises any of bismuth, chromium, copper, ferrous metal, tin, tungsten, zinc, or a mixture thereof.

Embodiment 38. The article of any one of embodiments 35 to 37, further comprising a foam layer.

Embodiment 39. The article of embodiment 38, wherein the first adhesive layer is positioned between the primer layer and the foam layer.

Embodiment 40. The article of embodiment 38 or 39, further comprising a second adhesive layer, wherein the foam layer is positioned between the first adhesive layer and the second adhesive layer.

Embodiment 41. The article of embodiment 40, wherein the second adhesive layer is attached to a substrate.

Embodiment 42. The article of embodiment 41, wherein the substrate is a release liner or a wheel.

Embodiment 43. A method of bonding a composite element to a foam tape layer, the method comprising:
providing a composite element comprising a polymer and particulate dispersed in the polymer;
providing a primer comprising an amino-substituted organosilane ester and a solvent;
providing a foam layer having a first adhesive layer disposed on a first major surface of the foam layer;
disposing the primer onto the composite element, the first adhesive layer, or both, to form a primer layer; and
bringing together the composite element and the first adhesive layer, wherein the primer layer is positioned between the composite element and the first adhesive layer.

Embodiment 44. The method of embodiment 43, wherein the polymer is a polymer layer.

Embodiment 45. The method of embodiment 43 or 44, wherein the polymer is a fluoropolymer.

Embodiment 46. The method of any one of embodiments 43 to 45, wherein the solvent is acetone, methyl ethyl ketone, or a mixture thereof.

Embodiment 47. The method of any one of embodiments 43 to 46, wherein the amino-substituted organosilane ester is 3-(2-aminoethyl)aminopropyl trimethoxysilane.

Embodiment 48. The method of any one of embodiments 43 to 47, wherein the particulate is metal particulate.

Embodiment 49. The method of embodiment 48, wherein the metal particulate comprises any of bismuth, chromium, copper, ferrous metal, tin, tungsten, zinc, or a mixture thereof.

Embodiment 50. The method of any one of embodiments 43 to 49, wherein the foam layer further comprises a second adhesive layer disposed on a second major surface thereof.

Embodiment 51. The method of embodiment 50, further comprising adhering the second adhesive layer to a substrate.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials

| | |
|---|---|
| "DBU" | 1,8-diazabicyclo 5.4.0 undec-7-ene, obtained from Aldrich Chemical Company, Milwaukee, WI |
| "AEAPTMS" | 3-(2-aminoethyl)aminopropyl trimethoxy silane was obtained from Gelest, Inc., Morrisville, PA |
| "EX4008" | an acrylic foam tape with acrylic pressure sensitive adhesives on each side, commercially available from 3M Company, St. Paul, MN, under trade designation "3M ACRYLIC PLUS TAPE SERIES EX4008" |
| "SAFT 2110" | an acrylic foam tape with acrylic pressure sensitive adhesives on each side, commercially available from 3M Company, St. Paul, MN, under trade designation "3M SOLAR ACRYLIC FOAM TAPE 2110" |
| "THV500" | a fluorinated terpolymer commercially available from 3M Company, St. Paul, MN, under trade designation "DYNEON THV 500 FLUOROTHERMOPLASTIC" |
| "THV 610" | a fluorinated terpolymer commercially available from 3M Company, St. Paul, MN, under trade designation "DYNEON THV 610 FLUOROTHERMOPLASTIC" |
| "THV 221" | a fluorinated terpolymer commercially available from 3M Company, St. Paul, MN, ender the trade designation "DYNEON THV 221 FLUOROTHERMOPLASTIC" |
| "UVITEX" | 2,5 thiophenedylbis(5-tert-butyl-1,3-benzoxazole), a fluorescent whitening agent, was obtained from Ciba Specialty Chemicals, Basel, Switzerland, under trade designation "UVITEX" |

Examples 1 to 5 and Comparative Examples 1 and 2

For Examples 1-3, a primer composition was prepared by blending AEAPTMS, using DBU as a catalyst, in methyl ethyl ketone (MEK) as described below in Table 1. Comparative Examples 1 and 2 ("Comp. 1" and "Comp. 2") were prepared by dissolving AEAPTMS in MEK, without the addition of DBU. The primer solutions were then applied on white THV 500 films with a paper towel. The primers were dried at room temperature, subsequently adhesive tape EX4008 was laminated against the primed white THV500 at room temperature. The time required for adhesion was measured and reported below in Table 1. After 30 minutes of hold the strength of adhesion was examined by trying to separate the adhesive tape from the THV 500 film. As reported in Table 1, the failure of the laminates was a result of foam tape split indicating good adhesion. However, Example 1 to 3 samples developed adhesion much sooner than samples of Comp. 1 and Comp. 2.

TABLE 1

| Example | Primer composition | Adhesion speed at room temp. | Adhesion failure mode after 30 min. |
|---|---|---|---|
| Comp. 1 | 5.0 wt. % AEAPTMS | After 10 minutes | Foam tape split |
| Comp. 2 | 2.5 wt. % AEAPTMS | After 10 minutes | Foam tape split |
| 1 | 5.0 wt. % AEAPTMS; 1 wt. % DBU | After 5-10 seconds | Foam tape split |
| 2 | 2.5 wt. % AEAPTMS; 1 wt. % DBU | After 5-10 seconds | Foam tape split |
| 3 | 2.5 wt. % AEAPTMS; 0.5 wt. % DBU | After 5-10 seconds | Foam tape split |

Examples 4 and 5

For Examples 4 and 5, primer compositions were prepared by blending an AEAPTMS and DBU catalyst in MEK as described below in Table 3. The primer compositions of Examples 4 and 5 each contained 1 wt. % of UVITEX as a fluorescent whitening agent. The primer solutions were then applied on TN4000 extruded wheel weight composites (the composite contained stainless steel particles and pigment, dispersed in fluoropolymer THV 221) using a nylon foam applicator and at room temperature as described in Table 3 below. The dried, primed extruded wheel weight composites were subsequently laminated to EX4008 at room temperature. After lamination, the samples were tested for determining the adhesion strength after 1 minutes, 1 hour, 6 hours and 24 hours. To measure peel strength, the laminates were mounted on aluminum platen of an Instron mechanical tester (Model 5565, obtained from Instron, Norwood, Mass.) with the extruded wheel weight composites at the bottom and pulling the EX4008 tape at 90-degree angle at a rate of 12 inches (30.5 centimeters) per minute rate. The average peel value over 4 inches (10 centimeters) was calculated. The results are summarized in Table 3 below.

TABLE 3

| | | Adhesion Strength (N/cm) (average of two values) | | | |
|---|---|---|---|---|---|
| Example | Primer composition | After 1 min | After 1 hr. | After 6 hrs. | After 24 hrs. |
| 4 | 3.0 wt. % AEAPTMS; 0.6 wt. % DBU; | 7.1 | 26.7 | 38.1 | 46.3 |
| 5 | 5.0 wt. % AEAPTMS; 1.0 wt. % DBU | 6.1 | 23.1 | 40.9 | 44.9 |

Example 6 and Comparative Example 3

For Example 6 and Comparative Example 3 ("Comp. 3"), a primer composition was prepared by blending AEAPTMS and DBU catalyst in isopropyl alcohol (IPA) using the amounts listed below in Table 4. The primer solutions were then applied on white THV 500 films with a paper towel. The primers were dried at room temperature, subsequently adhesive tape SAFT 2110 was laminated against the primed white THV500 at room temperature. After 1 hour and 24 hours of hold, the strength of adhesion was examined by trying to separate the SAFT 2110 adhesive tape from the THV 500 film.

TABLE 4

| Example | Primer composition | Adhesion after 1 hr. | Adhesion after 24 hrs. |
|---|---|---|---|
| Comp. 3 | 5.0 wt. % AEAPTMS | Poor | Poor |
| 6 | 5.0 wt. % AEAPTMS; 1 wt. % DBU | Some | Good |

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc. that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A bonded article comprising:
   a composite element comprising a polymer and particulate dispersed in the polymer;
   a primer layer consisting of an amino-substituted organosilane ester or ester equivalent and an amidine catalyst and optionally a solvent, wherein the amidine catalyst has a general formula:

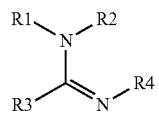

wherein R1, R2, R3, and R4 are each independently selected from hydrogen, monovalent organic groups, monovalent heteroorganic groups, and combinations thereof; and
   a first adhesive layer,
      wherein the primer layer bonds together the composite element and the first adhesive layer.

2. The article of claim 1, wherein the polymer is in the form of a polymer layer.

3. The article of claim 1, wherein the polymer is a fluoropolymer.

4. The article of claim 3, wherein the fluoropolymer is a copolymer of tetrafluoroethylene, hexafluoropropylene, and at least one olefin selected from the group consisting of ethylene, propylene, 1-butene, and combinations thereof.

5. The article of claim 3, wherein the fluoropolymer is a copolymer of vinyl fluoride, vinylidene fluoride, and at least one olefin selected from the group consisting of ethylene, propylene, 1-butene, and combinations thereof.

6. The article of claim 1, wherein the particulate is metal particulate.

7. The article of claim 6, wherein the metal particulate comprises stainless steel.

8. The article of claim 6, wherein the metal particulate comprises any of bismuth, chromium, copper, ferrous metal, tin, tungsten, zinc, or a mixture thereof.

9. The article of claim 1, further comprising a foam layer.

10. The article of claim 9, wherein the first adhesive layer is positioned between the primer layer and the foam layer.

11. The article of claim 9, further comprising a second adhesive layer, wherein the foam layer is positioned between the first adhesive layer and the second adhesive layer.

12. The article of claim 11, wherein the second adhesive layer is attached to a substrate.

13. The article of claim 12, wherein the substrate is a release liner or a wheel.

14. The article of claim 1, wherein the amidine catalyst is a bicyclic amidine.

15. The article of claim 14, wherein the amidine catalyst is 1,8-diazabicyclo[5.4.0]undec-7-ene.

16. The article of claim 1, wherein the amino-substituted organosilane ester or ester equivalent is present in an amount of from 70 weight percent to 95 weight percent relative to the total weight of the primer layer, and wherein the amidine catalyst is present in amount of from 5 weight percent to 30 weight percent relative wo the total weight of the primer layer.

17. The article of claim 1, with the proviso that if the polymer is a copolymer of tetrafluoroethylene, hexafluoropropylene, and at least one olefin selected from the group consisting of ethylene, propylene, 1-butene, and combinations thereof and the particulate is stainless steel and the amino-substituted organosilane ester is 3-(2-aminoethyl) aminopropyl trimethoxysilane, then the amidine catalyst is not 1,8-diazabicyclo[5.4.0]undec-7-ene.

18. A bonded article comprising:
a composite element comprising a polymer and particulate dispersed in the polymer;
a primer layer consisting of an amino-substituted organosilane ester or ester equivalent and an amidine catalyst and optionally a solvent, wherein wherein the amidine catalyst has a general formula:

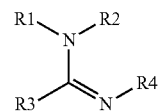

wherein R1, R2, R3, and R4 are each independently selected from hydrogen, monovalent organic groups, monovalent heteroorganic groups, and combinations thereof; and
a first adhesive layer,
wherein the primer layer bonds together the composite element and the first adhesive layer.

19. The article of claim 18, wherein the time required for adhesion of the composite element and the first adhesive layer at room temperature is from 5 to 30 seconds.

* * * * *